United States Patent
Walker et al.

[11] Patent Number: 6,041,308
[45] Date of Patent: Mar. 21, 2000

[54] SYSTEM AND METHOD FOR MOTIVATING SUBMISSION OF CONDITIONAL PURCHASE OFFERS

[75] Inventors: Jay S. Walker, Ridgefield; T. Scott Case, Darien; Tracy Hartmann, Stamford; Daniel E. Tedesco, New Canaan, all of Conn.

[73] Assignee: priceline.com Incorporated, Stamford, Conn.

[*] Notice: This patent is subject to a terminal disclaimer.

[21] Appl. No.: 09/205,787

[22] Filed: Dec. 4, 1998

Related U.S. Application Data

[63] Continuation-in-part of application No. 08/943,483, Oct. 3, 1997, which is a continuation-in-part of application No. 08/923,683, Sep. 4, 1997, which is a continuation-in-part of application No. 08/889,319, Jul. 8, 1997, which is a continuation-in-part of application No. 08/707,660, Sep. 4, 1996, Pat. No. 5,794,207.

[51] Int. Cl.[7] ................................................. G06F 19/00
[52] U.S. Cl. ................................. 705/14; 705/26; 705/1
[58] Field of Search ........................... 705/14, 1, 5, 13, 705/15, 26, 27, 37, 35, 38; 295/226, 228, 236, 237, 239; 340/825.3

[56] References Cited

U.S. PATENT DOCUMENTS

| | | |
|---|---|---|
| 3,573,747 | 4/1971 | Adams et al. . |
| 4,247,759 | 1/1981 | Yuris et al. . |
| 4,449,186 | 5/1984 | Kelly et al. . |
| 4,553,222 | 11/1985 | Kurland et al. . |
| 4,677,552 | 6/1987 | Sibley, Jr. . |
| 4,751,728 | 6/1988 | Treat . |
| 4,789,928 | 12/1988 | Fujisaki . |
| 4,799,156 | 1/1989 | Shavit et al. . |
| 4,903,201 | 2/1990 | Wagner . |
| 4,931,932 | 6/1990 | Dalnekoff et al. . |
| 5,021,953 | 6/1991 | Webber et al. . |

(List continued on next page.)

FOREIGN PATENT DOCUMENTS

| | | |
|---|---|---|
| 97/34356 | 10/1996 | WIPO . |
| 97/46961 | 12/1997 | WIPO . |

OTHER PUBLICATIONS

Koepper, Ken, "Room Inventory Auctioning: The Next CRS Generation", Lodging, Jan. 1990 at pp. 26, 29–30.

Fishkin, Ken, Foresight Exchange Tutorial: (http://www.ideosphere.com/fx/docs/tutorial.html) Feb. 19, 1999 at pp. 1–5.

(List continued on next page.)

*Primary Examiner*—Allen R. Macdonald
*Assistant Examiner*—Penny Caudle
*Attorney, Agent, or Firm*—Morgan & Finnegan LLP; Jeffrey L. Brandt

[57] ABSTRACT

A system and method are disclosed for encouraging buyers to submit CPOs to a CPO management system for a desired product. The CPO management system processes each received CPO to determine whether one or more sellers are willing to accept a given CPO. The disclosed CPO management system compensates buyers if the buyer's conditional purchase offer is rejected, or expires before an acceptance is received. If a CPO is rejected by the sellers, or has expired before an acceptance is received, the CPO management system evaluates one or more stored compensation offers to determine if the buyer is eligible for rejection compensation. The compensation offers may optionally require that the conditional purchase offer satisfies one or more additional predefined eligibility criteria. If the predefined criteria is met, the rejection compensation is provided to the buyer. The rejection compensation can include, for example, (i) a cash award, (ii) a prize, or (iii) a coupon or credit that may be redeemed for a discount against future transactions, thereby encouraging future use.

71 Claims, 10 Drawing Sheets

U.S. PATENT DOCUMENTS

| | | |
|---|---|---|
| 5,136,501 | 8/1992 | Silverman et al. . |
| 5,168,446 | 12/1992 | Wiseman . |
| 5,191,523 | 3/1993 | Whitesage . |
| 5,191,613 | 3/1993 | Graziano et al. . |
| 5,224,034 | 6/1993 | Katz et al. . |
| 5,243,515 | 9/1993 | Lee . |
| 5,253,165 | 10/1993 | Leiseca et al. . |
| 5,262,941 | 11/1993 | Saladin et al. . |
| 5,283,731 | 2/1994 | Lalonde et al. . |
| 5,297,031 | 3/1994 | Gutterman et al. . |
| 5,329,589 | 7/1994 | Fraser et al. . |
| 5,361,199 | 11/1994 | Shoquist et al. . |
| 5,404,291 | 4/1995 | Kerr et al. . |
| 5,420,914 | 5/1995 | Blumhardt . |
| 5,426,281 | 6/1995 | Abecassis . |
| 5,444,630 | 8/1995 | Dlugos . |
| 5,467,269 | 11/1995 | Flaten . |
| 5,500,793 | 3/1996 | Deming, Jr. et al. . |
| 5,517,555 | 5/1996 | Amadon et al. . |
| 5,519,769 | 5/1996 | Weinberger et al. . |
| 5,553,131 | 9/1996 | Minervino, Jr. et al. . |
| 5,557,517 | 9/1996 | Daugherty, III . |
| 5,557,518 | 9/1996 | Rosen . |
| 5,570,283 | 10/1996 | Shoolery et al. . |
| 5,592,375 | 1/1997 | Salmon et al. . |
| 5,606,602 | 2/1997 | Johnson et al. . |
| 5,611,052 | 3/1997 | Dykstra et al. . |
| 5,615,269 | 3/1997 | Micali . |
| 5,664,115 | 9/1997 | Fraser . |
| 5,689,652 | 11/1997 | Lupien et al. . |
| 5,694,551 | 12/1997 | Doyle et al. . |
| 5,696,965 | 12/1997 | Dedrick . |
| 5,717,989 | 2/1998 | Tozzoli et al. . |
| 5,732,400 | 3/1998 | Mandler et al. . |
| 5,745,882 | 4/1998 | Bixler et al. . |
| 5,757,917 | 5/1998 | Rose et al. . |
| 5,758,328 | 5/1998 | Giovannoli . |
| 5,794,207 | 8/1998 | Walker et al. . |
| 5,794,219 | 8/1998 | Brown . |
| 5,797,127 | 8/1998 | Walker et al. . |
| 5,799,285 | 8/1998 | Klingman . |
| 5,826,244 | 10/1998 | Huberman . |
| 5,832,452 | 11/1998 | Schneider et al. . |
| 5,835,896 | 11/1998 | Fisher et al. . |
| 5,845,265 | 12/1998 | Woolston . |

OTHER PUBLICATIONS

"Bid.com 1998 Third–Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/virtualH/virtual h02.html), download date: Sep. 20, 1998.

"First Source Become a Member", More Reasons To Join First Source! (http://www.fsource.com/bene.html), download date: Sep. 20, 1998.

Jeffrey Davis, "Big Storm rising", Business 2.0, Sep., 1998, at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred bidder Harvest, Sep. 1997, p. 58.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

The Loan Process, downloaded form www.sdtech.com/mls/process on Aug. 7, 1997.

Trade–Direct: We Help You Trade With Confidence, selected pages downloaded from www.trade–direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer Company Press Release, Yahoo Business Wire (Jun. 30, 1997).

Frequently Asked Questions About: Airhitch, selected pages downloaded from www.isicom.com.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, $4^{th}$ ACM Conference on Computer and Communications Security, ACM Press, 117–124 (Apr. 1997).

Bryant, Adam, "Shaking Up Air Fares' Status Quo", The New York Times, Mar. 31, 1997.

Silverman, Robert, "GM Drives Wed Ad Insertion Network", Inside Media, Feb. 26, 1997, vol. 9, No. 4, p. 1; ISSN:1046–5316.

"Flycast Introduces Unique 'Open Exchange' Match–Making Service", Interactive Marketing News, Feb. 21, 1997, vol. 4, No. 8.

"UK's World Telecom Unveils New WorldSaver Tariffs," Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 19.

"World's First Real–Time Travel Auction Service to Be Available Via World Wide Web: ETA To Open Bidding to Consumers," Business Wire, Dialog Trade & Industry Database (Nov. 4, 1996).

Gessel, Chris, "Trade Smarter: The Limit of Orders", Investor's Business Daily, Oct. 14, 1996, p. A1.

Crest: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded form http://www.infoworld.com.

About Rate Hunter, downloaded from http://207.49.64.77/rhprodrh.htm on Jul. 14, 1996.

Cathay Pacific Online Ticket Bidding, World Internet News Digest (May 8, 1996).
Sothbey's General Information, downloaded from www.sothebys.com (1996).
CyberBid, Net Fun Ltd.(1996).
Nimmer, Raymond, T., "Electronic Contracting; Legal Issues", 14 J. Marshall J. Computer & Info L.211, Winter, 1996.
American Law Institute, Draft–Uniform Commercial Code Revised Article 2 (Sales), parts 2, 3, and 7, pp. 1–15, Jan. 4, 1996.
Speidel, Richard E. & Schott, Lee A., "Impact of Electronic Contracting on Contract Formation Under Revised UCC Article 2, Sales",C878 ALI–ABA 335, Dec. 9, 1993.
Hainer, Cathy and Grossman,Cathy Lynn, "Where Vactioning Kids Get Good Care", USA Today, Apr. 1,1992, at p. 4D.
Del Russo, Laura, "Ticket–Bidding Firm Closes Its Door," Travel Weekly, Mar. 12, 1992.
"Newsletters", The Atlanta Constitution, Mar. 1, 1992, p. K13.
"CRTL's Blue Ribbon Deals for 1992", Consumer Reports Travel Letter, Jan. 1992, vol. 8, No. 1, at pp. 3–5.
Traveler's Notes; Bookit Report, Consumer Reports Travel Letter, Dec. 1991 at p. 143.
Feldman, Joan M., "To Rein In Those CSRs; Computer Reservation Systems", Air Transport World, Dec. 1991, at p. 89.
"Money Briefs; Buy Low, Fly High", Gannet News Service, Nov. 20, 1991.
"Buy Low, Fly High", USA Today, Nov. 14, 1991 at p. 15.
Traveler's Notes; Easier Airfair Bidding, Consumer Reports Travel Letter, Oct. 1991 at p. 119.
Nelson, Janet "Practical Traveler; Airlines Relaxing Policy on No–Refund Tickets", The New York Times, Sep. 22, 1991 at p. 3 of Section 5.
Pelline, Jeff, "New Service; Now You Can Make a Bid on Your Next Airline Ticket Home", The Orange County Register, Sep. 1, 1991 at p. E01.
"Bookit Airfare Bidding System (Fax for Your Plane Ticket?)", Consumer Reports Travel Letter, Sep. 1991, pp. 97 & 106.
Upton, Kim "French Say Monoliths Off–limits to Visitors", Los Angeles Times, Aug. 25, 1991.
Pelline, Jeff, "Travelers Bidding on Airline Tickets; SF Firm Offers Chance for Cut–Rate Fares", San Francisco Chronicle, Section A4, Aug. 19, 1991.
Carey, Christopher, "Firm Offers Auction For Airline Tickets", St. Louis Post–Dispatch, Aug. 7, 1991 at p. 1B.
Del Rosso, Laura, "Marketel Says It Plans to Launch Air Fare 'Auction' in June", Travel Weekly, Apr. 29, 1991.
NASDAQ Adds Enhancements to SOES Limit Order File, Securities Week, Nov. 26, 1990, p. 5.
Ritter, Jeffrey B., "Scope of the Uniform Commercial Code: Computer Contracting Cases and Electrical Commercial Practices", 45 Bus. Law 2533, Aug., 1990.

Greenburg, Peter, S., "Judging DeRegulation", The Record, Jul. 22, 1990 at p. T01.
Greenburg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.
Wallace, David, "Company Planning to Let Fliers Bid on Airfares", Philadelphia Business Journal, Mar. 26, 1990 at p. 15.
"Letter to Business Extra", The San Francisco Chronicle, Dec. 26, 1989 at p. C7.
Schrage, Michael, "An Experiment in Economic Theory; Labs Testing Real Markets", The Record Section B1, Nov. 26, 1989.
Schrage, Michael Innovation/Michael Schrage: Laboratory Experiments with Market Economics, Los Angeles Times, Nov. 23, 1989 at p. D1.
Golden, Fran "AAL's Riga Doubts Marketel's Appeal to Retailers", Travel Weekly, Nov. 13, 1989.
Del Rosso, Laura, Firm Proposes ticket–bidding system; Marketel explores electronic auction of travel; Marketel International., Travel Weekly, Section No. 91, vol. 48, p. 1; Nov. 13, 1989.
Carlsen, Clifford, "Polaris Group Set to Fly the Leveraged Sky", San Francisco Business Times, Nov. 6, 1989 at p. 1.
Kuttner, Robert, "Computers May Turn the World into One Big Commodities Pit", Business Week, Sep. 11, 1989.
Carlsen, Clifford, "From Airline Tickets to Human Organs, the Electronic Markets Are Booming", San Francisco Business Times, Aug. 14, 1989 at p. 17.
"Public May Submit Bids To Get Bargain Rates", Wall Street Journal, Section 2; p. 1, col. 1; Aug. 1, 1989.
American Airlines Internet Silent Auction, selected pages downloaded from www.americanair.com.
Apollo Host Computer, selected pages downloaded from www.appollo.com.
"Auctioning unsold airline tickets." (http://www.newciv.org/GIB/BOV/BV–409.HTMI), at p. 1.
Cathay Pacific:CyberTraveler Auction #3—Official Rules, selected pages downloaded from www.cathaypacific.com.
CSM Online: About Collector's Super Mall downloaded from www.csmonline.com.
Sabre Decision Technologies, selected pages downloaded from www.sabre.com.
PhoneMiser: Frequently Asked Questions, downloaded from www.phonemiser.com.
The United Computer Exchange: How It All Works, selected pages downloaded from www.uce.com.
Tired of Shopping For the Best Home Loan?, Mortgage Loan Specialists.

| SELLER IDENTIFIER 340 | SELLER NAME 350 | CPO TRACKING NUMBER 360 | SELLER ACCOUNT NUMBER 370 |
|---|---|---|---|
| S67676 | AMERICAN AIRLINES | 627 | 7199987 |
| S89898 | DELTA AIRLINES | -- | 5567891 |
| S45454 | AT&T | 852 | 79257431 |
| S42929 | HERTZ | -- | 3299467 |
| S81818 | SHERATON | 627 | 1234567 |
| S47474 | HILTON | -- | 774368 |

FIG. 3

| BUYER IDENTIFIER 420 | NAME 430 | ADDRESS 440 | CREDIT CARD ACCOUNT NUMBER 450 | CPO TRACKING NUMBER(S) 460 |
|---|---|---|---|---|
| B2222 | JOHN SMITH | 3 MAIN ST. | 2222-2222-2222-2222 | 345 |
| B2223 | SUE JOHNSON | 4 PINE ST. | 3333-3333-3333-3333 | 333 |
| B2224 | DAVE McCARTHY | 6 TEMPLE ST. | 4444-4444-4444-4444 | 627 |

FIG. 4

| CPO TRACKING NUMBER 540 | BUYER IDENTIFIER 545 | SUBJECT 550 | CONDITIONS 555 | CPO PRICE 565 | STATUS 575 | COMPENSATION STATUS 580 | COMPENSATION ID 585 |
|---|---|---|---|---|---|---|---|
| 852 | B22225 | HOTEL ROOM | 2 ROOM SUITE BOSTON 8/1/97 - 8/3/97 | $180.00 | ACCEPTED | NOT ELIGIBLE | N/A |
| 874 | B22226 | AIRLINE TICKET | R/T LAX - JFK LEAVE 9/15/97, RETURN 9/17/97 | $250.00 | ACTIVE | PENDING | 3445 |
| 627 | B22224 | AIRLINE TICKET | R/T JFK - LAX LEAVE 8/1/97, RETURN 8/7/97 | $210.00 | REJECTED | COMPENSATION SENT | 3445 |
| 345 | B22222 | CAR RENTAL | NEW YORK MID-SIZE CAR 8/14/97 - 8/16/97 | $100.00 | ACTIVE | PENDING | 3456 |
| 333 | B22223 | AIRLINE TICKET | R/T EWR - ORL LEAVE 8/14/97, RETURN 8/21/97 | $150.00 | REJECTED | NOT ELIGIBLE | N/A |

FIG. 5

| CPO RULE NUMBER 640 | SELLER IDENTIFIER 645 | REQUIRED CPO CONDITION(S) 650 | MINIMUM PRICE 655 |
|---|---|---|---|
| 4572 | S47474 | WEEKEND CAR RENTAL, NEW YORK, NY, 10/1/98 - 12/31/98 | $225.00 |
| 5555 | S81818 | WEEKEND HOTEL, BOSTON, MA, 10/1/98 - 12/31/98 | $99.00/NIGHT DOUBLE OCCUPANCY |
| 6523 | S89898 | ROUND TRIP AIR TRAVEL TO LOS ANGELES, CA, 1/5/99 - 2/22/99; SAT. NIGHT STAY REQUIRED | $199.00 PER PERSON |

FIG. 6

| COMPENSATION IDENTIFIER 740 | PRODUCT CLASS 745 | ELIGIBLE OFFER CONDITIONS 750 | COMPENSATION DESCRIPTION 755 |
|---|---|---|---|
| 3445 | AIRLINE TICKETS | OFFER PRICE > $200.00 | FREE WEKEND CAR RENTAL COUPON |
| 3456 | CAR RENTAL | OFFER PRICE > $25/DAY (3 DAY MIN.) | $25.00 CASH |

SYSTEM AND METHOD FOR MOTIVATING SUBMISSION OF CONDITIONAL PURCHASE OFFERS

This application is a continuation-in-part of U.S. patent application Ser. No. 08/943,483, filed Oct. 3, 1997, which is a continuation-in-part of U.S. patent application Ser. No. 08/923,683, which is a continuation-in-part of U.S. patent application Ser. No. 08/889,319, filed Jul. 8, 1997, which is a continuation-in-part of U.S. patent application Ser. No. 08/707,660, filed Sep. 4, 1996, now issued U.S. Pat. No. 5,794,207, each of which is incorporated in its entirety by reference herein.

FIELD OF THE INVENTION

The present invention relates generally to a system for processing the sale of products and, more particularly, to methods and apparatus for processing the sale of products, such as airline tickets and automobiles, to buyers who have submitted a purchase offer for the purchase of such products.

BACKGROUND OF THE INVENTION

Most systems for processing the sale of products are seller-driven, whereby the seller prices, packages, configures and offers the product for sale, and the buyer decides whether or not to accept the seller's offer. In a buyer-driven system, however, the buyer dictates the terms of the offer and one or more sellers decide whether or not to accept the offer. A "help wanted" advertisement, for example, is a buyer-driven inquiry since the employer is looking to locate and buy the services of a qualified employee. The inquiry is advertised to a large number of potential employees, who may respond by submitting their resumes to the prospective employer.

Priceline.com, Incorporated of Stamford, Conn. is a merchant that has successfully implemented a buyer-driven system for the sale of products, such as airline tickets and automobiles. Priceline.com utilizes a Conditional Purchase Offer (CPO) Management System, described in the parent and grandparent applications to the present invention, that processes conditional purchase offers received from individual buyers. These conditional purchase offers contain one or more buyer-defined conditions for the purchase of goods or services, at a buyer-defined price. They are typically guaranteed by a general-purpose account, such as a debit or credit account, and thereby provide sellers with a mechanism for enforcing any agreement that may be reached with the buyer. The conditional purchase offers are provided by the CPO Management System to sellers, either directly or using seller-supplied rates, for individual sellers to either accept or reject. If a seller accepts a conditional purchase offer, the CPO Management System binds the buyer on behalf of the accepting seller, to form a legally binding contract.

Thus, the CPO Management System empowers individual buyers to obtain goods and services at a price set by the buyer. The CPO Management System provides numerous commercial advantages to sellers as well. For example, the CPO Management System permits individual sellers to effectively sell excess capacity when actual demand fails to meet forecasted demand. In particular, the CPO Management System provides an effective mechanism for sellers to be confident that if they accept a buyer's offer, the buyer will purchase the requested goods or services at the agreed-upon price, and not just use the information to ascertain the seller's underlying level of price flexibility, which, if known to a seller's competitors or customers, could impact the seller's overall revenue structure.

For many transactions, the CPO Management System will effectively complete transactions in this manner. Invariably, however, a percentage of buyers will submit purchase offers that are not acceptable to any seller, often because the price offered by the buyer is too low. The success of the CPO Management System depends, at least in part, on its utilization by a large number of both buyers and sellers. Specifically, buyers are incented to submit conditional purchase offers if they know the conditional purchase offers will be reviewed by a large number of potential sellers. Sellers are incented to consider conditional purchase offers if they can expect a large number of attractive offers. In addition to being a lost business opportunity, unacceptable conditional purchase offers require buyers and sellers to spend time submitting and reviewing such conditional purchase offers. Thus, buyers and sellers alike may be frustrated and discouraged from utilizing the CPO Management System, if the acceptance rate for submitted conditional purchase offers does not meet satisfactory levels.

Thus, while it is important to increase buyer demand generally, it is even more desirable to stimulate demand in a manner that encourages buyers to submit conditional purchase offers that are more likely to be accepted by sellers. In addition, in order to curb buyer dissatisfaction in the event that a conditional purchase offer is not accepted, and to reduce the perceived difficulties that may be associated with submitting a conditional purchase offer, it is desirable to compensate buyers who are unable to obtain the sought-after product.

SUMMARY OF THE INVENTION

A system and method are disclosed for encouraging buyers to submit CPOs to a CPO management system for a desired product. The CPO management system processes each received CPO to determine whether one or more sellers are willing to accept a given CPO. As used herein, a CPO is an offer containing one or more conditions submitted by a buyer for the purchase of a product at a buyer-defined price.

The disclosed CPO management system compensates a buyer if the buyer's conditional purchase offer is rejected, or expires before an acceptance is received. If a CPO is rejected by the sellers, or has expired before an acceptance is received, the CPO management system evaluates one or more stored compensation offers to determine if the buyer is eligible for rejection compensation. The compensation offers may optionally require that the conditional purchase offer satisfies one or more additional predefined eligibility criteria in order to be eligible for the rejection compensation. If the predefined criteria is met, the rejection compensation is provided to the buyer. The rejection compensation can include, for example, (i) a cash award, (ii) a prize, (iii) a coupon or credit that may be redeemed for a discount against future transactions, thereby encouraging future use, or (iv) any other compensation effective to motivate a buyer to submit a CPO.

Thus, the present invention stimulates demand and curbs buyer dissatisfaction by providing compensation to the buyer if the offer is not accepted. In addition, the predefined eligibility criteria can be used to stimulate demand in a desired manner, and thereby increase the reasonability of conditional purchase offers. For example, the CPO management system can encourage buyers to submit conditional purchase offers having an offer price greater than a specified minimum price, which may be more likely to be accepted.

A more complete understanding of the present invention, as well as further features and advantages of the present invention, will be obtained by reference to the following detailed description and drawings.

BRIEF DESCRIPTION OF THE DRAWINGS

FIG. 3 illustrates a sample table from the seller database of FIG. 2;

FIG. 4 illustrates a sample table from the buyer database of FIG. 2;

FIG. 5 illustrates a sample table from the offer database of FIG. 2;

FIG. 6 illustrates a sample table from the seller rules database of FIG. 2;

FIG. 7 illustrates a sample table from the compensation database of FIG. 2;

DETAILED DESCRIPTION

Figure 1:
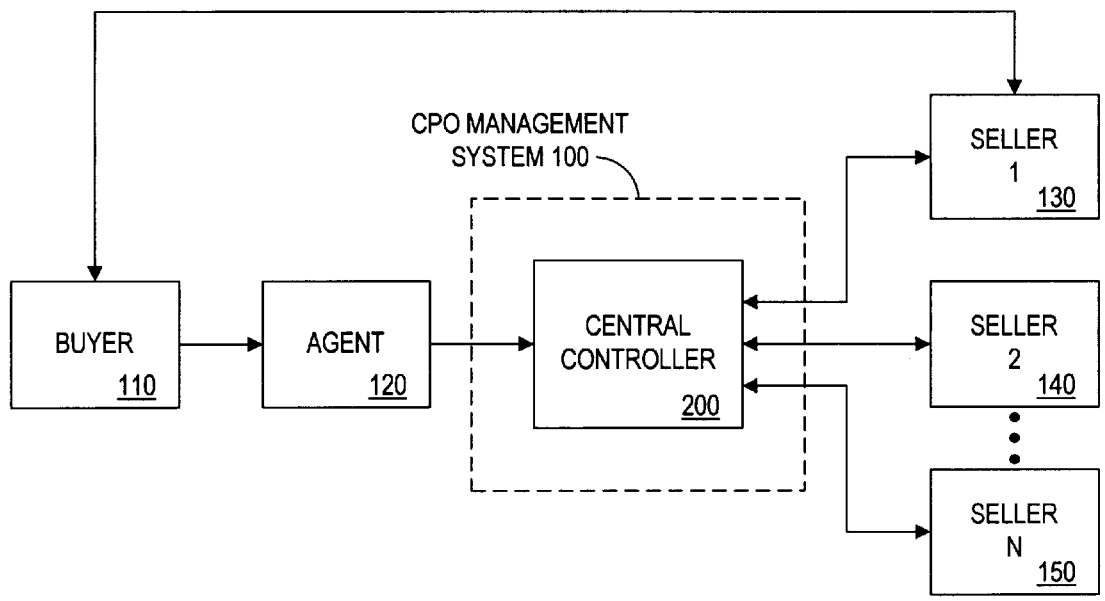
FIG. 1 is a schematic block diagram illustrating a conditional purchase offer (CPO) management system in accordance with the present invention.

FIG. 1 shows a conditional purchase offer (CPO) management system 100 for receiving and processing CPOs for one or more goods or services, from one or more buyers 110 or agents 120 (on behalf of buyers 110). The CPO management system 100 determines whether one or more sellers, such as sellers 130, 140, 150 are willing to accept a given CPO. As discussed further below, if a seller accepts a given CPO, the CPO management system 100 is operated to bind the buyer on behalf of the accepting seller, to form a legally binding contract.

CPO Terminology

As used herein, the following terms are defined to mean:

Agency-Based Seller—A seller who has delegated authority to the CPO management system operator to accept or reject a given CPO using seller-defined CPO Rules.

Broadcast-Based Seller—A seller who has received a CPO from the CPO management system (directly or by, for example, access to an electronic posting) for evaluation.

Conditional Purchase Offer (CPO)—An offer containing one or more conditions submitted by a buyer for the purchase of goods and/or services at a buyer-defined price.

Binding Conditional Purchase Offer (Binding CPO)—A binding offer containing one or more conditions submitted by a buyer for the purchase of goods and/or services at a buyer-defined price. As compared to a CPO, a Binding CPO includes a payment guarantee, for example with a General Purpose Account, and authorization to debit the Account upon acceptance of the CPO.

Conditional Purchase Offer (CPO) Rule—A restriction defined by an Agency-Based Seller under which the operator of the CPO management system may act as an agent to determine whether to fill a CPO for that Agency-Based Seller.

CPO Management System—One or more controllers that receive and process CPOs for one or more goods or services, from one or more buyers, to determine if one or more sellers (Agency-Based or Broadcast-Based Sellers) are willing to accept a CPO.

General Purpose Account—Any account from which payment can be made, including a credit or debit account.

According to a feature of the present invention, a CPO management system 100 is disclosed that compensates buyers (monetarily or otherwise) if the buyer's conditional purchase offer is not accepted. The CPO management system 100 evaluates each received CPO to identify CPOs which are rejected by sellers, or which have expired before an acceptance is received. If the CPO management system 100 determines that a received CPO is rejected by the sellers, or has expired before an acceptance is received, the CPO management system 100 evaluates one or more stored compensation offers to determine if the buyer is eligible for rejection compensation.

Thus, a buyer may be eligible for rejection compensation if their offer is not accepted by the CPO management system 100. In addition, the CPO management system 100 may require that the conditional purchase offer satisfies one or more additional predefined eligibility criteria in order to be eligible for the rejection compensation. In one embodiment, the predefined eligibility criteria for receiving rejection compensation is provided to a buyer before a CPO is submitted by the buyer. For example, the predefined eligibility criteria can require a minimum offer price to be eligible for the rejection compensation. The minimum offer price can be derived from historical, actual or forecasted pricing. If the predefined criteria is met, the rejection compensation is provided to the buyer. The rejection compensation can include, for example, (i) a cash award, (ii) a prize, (iii) a coupon or credit that may be redeemed for a discount against future transactions, thereby encouraging future use, or (iv) any other compensation effective to motivate a buyer to submit a CPO.

Thus, the present invention stimulates demand and curbs buyer dissatisfaction by providing compensation to the buyer if the offer is not accepted. Moreover, the CPO management system 100 can utilize the predefined eligibility criteria to stimulate demand in a desired manner, and thereby increase the reasonability of demand. For example, the CPO management system 100 can provide buyers with a coupon for a free weekend car rental as rejection compensation for all rejected conditional purchase offers for air travel having an offer price of at least $200.00. In this manner, the CPO management system 100 encourages buyers to submit conditional purchase offers having offer prices greater than $200.00, which may be more likely to be accepted. In addition, the CPO management system 100 can encourage buyers to agree to other conditions before they are eligible for rejection compensation, such as a Saturday night stay for air travel, that may make a conditional purchase offer more likely to be accepted.

In one embodiment, the CPO management system 100 may implement one or more features to ensure that buyers are not submitting multiple conditional purchase offers merely to obtain the rejection compensation. For example, for conditional purchase offers submitted by means of an online connection, for example, to a Web site, the CPO management system 100 may store a "cookie" on the buyer's computer so that the buyer may be recognized on subsequent visits to the Web site. In addition, the buyer may be subsequently identified by means of a credit card number buyer identifier submitted with the conditional purchase offer.

As shown in FIG. 1, the CPO management system 100 includes a central controller 200, discussed further below in conjunction with FIG. 2. The CPO management system 100 may provide a given CPO to selected sellers 130, 140, 150 based on predefined screening criteria, so that sellers only obtain CPOs that they may be interested in or are authorized to screen. Alternatively, the CPO management system 100 may provide all CPOs to all sellers for screening.

As discussed further below, each buyer 110 contacts the CPO management system 100, for example, by means of telephone, facsimile, online access (i.e. the Internet), electronic mail, in-person contact or through an agent, and provides the CPO management system 100 with the terms of the buyer's CPO. It is noted that each buyer 110 and seller 130, 140, 150 may employ a general-purpose computer for communicating with the CPO management system 100. The general-purpose computer may be comprised of a processing unit, a modem, memory means and any software required to communicate with the CPO management system 100.

The CPO management system 100, as well as any general-purpose computers utilized by buyers 110 or sellers 130, 140, 150 (collectively, the "nodes") transmit digitally encoded data and other information between one another. The communication links between the nodes can comprise, for example, a cable, fiber or wireless link on which electronic signals can propagate.

Agency and Broadcast-Based Sellers

According to one feature of the present invention, the CPO management system 100 provides an optional agency feature that permits the CPO management system 100 to accept or reject a given CPO on behalf of certain agency-based sellers 130 who have delegated such authority to the CPO management system 100. Thus, the CPO management system 100 (i) evaluates CPOs on behalf of certain agency-based sellers 130 who have delegated authority to the CPO management system 100 to accept or reject a given CPO, and (ii) permits broadcast-based sellers, such as sellers 140, 150 to evaluate CPOs independently.

Thus, the CPO management system 100 can optionally provide one or more CPOs to each broadcast-based seller 140, 150, for the seller 140, 150 to independently determine whether or not to accept a given CPO. It is noted that the CPO management system 100 can provide a CPO to each appropriate broadcast-based seller 140, 150, for example, by means of a broadcast transmission, or by means of posting the CPO, for example, on an electronic bulletin board or secure web site accessible by each broadcast-based seller 140, 150. Alternatively, the CPO management system 100 can evaluate one or more CPOs against a number of CPO rules defined by one or more agency-based sellers 130, to decide on behalf of an agency-based seller 130 whether to accept or reject a given CPO. An illustrative set of CPO rules for one illustrative agency-based seller 130 is set forth in FIG. 6. Thus, the CPO management system 100 can determine if one or more sellers 140, 150 accepts a given CPO by providing the CPO to each seller 140, 150 and receiving an acceptance or rejection, or by applying the CPO to the CPO rules to render a decision to either accept, reject or counter a CPO on behalf of a particular seller 130.

As discussed further below, a CPO rule is a set of restrictions defined by a given agency-based seller 130 under which the seller 130 is willing to accept a CPO. For a more detailed discussion of CPO rules, the manner in which they are generated, and related security issues, see U.S. patent application Ser. No. 08/889,319, entitled Conditional Purchase Offer Management System, filed Jul. 8, 1997, referenced herein above.

A CPO can optionally contain one or more buyer-defined variable or flexible conditions, typically specified using a range. For example, the variable condition may be a date range within which the product may be delivered by the seller. Other variable conditions might include a price range, a performance range or a quality range. The seller may then choose a product to fill the buyer's flexible condition within the specified range. Such a variable condition may provide substantial assistance to the seller in filling the buyer's CPO. For example, with respect to an airline ticket, the seller may be able to be meet a buyer's specified price if the CPO permits the seller to select a flight within a range of times or days.

It is desirable that in one embodiment the present invention prevents buyers from repetitively querying, or "pinging," the CPO management system 100 to determine the underlying price flexibility of the sellers. Such pinging might result in potential damage to the seller's price margins and profitability. As mentioned above, a binding CPO discourages pinging by ensuring that if an offer is accepted, the buyer must actually purchase the product. Another method of discouraging pinging includes preventing buyers from submitting repetitive, similar offers. For example, repetitive CPOs that change only the offer price in an effort to determine price flexibility may be blocked by the system. In one embodiment, subsequent CPOs by the same buyer are accepted by the CPO management system 100 only if there is some substantial change to the buyer specifications that would result in the purchase of an essentially different product. For example, with respect to the sale of airline tickets, subsequent CPOs may be accepted for processing only if there is a significant change in the itinerary. Yet another method for discouraging pinging is to require a payment or fee for each submission of a CPO.

In one embodiment of the invention, seller identities are maintained anonymous within the CPO management system 100 until a CPO is accepted. Such seller anonymity, by itself and in combination with the discouragement of price pinging discussed above, enables sellers to participate in the CPO process without fear of undercutting their published price structures and losing their regular customer base. For example, most retailers have published product prices, and loyal customers who willingly pay those prices. Participating in the CPO management system 100 enables a seller to discount those products, potentially below its published prices, to fill offers from buyers who might not otherwise pay published prices. With anonymity, these sellers can more freely participate in the CPO process with less fear of losing their regular customers and undercutting their published price structure.

Figure 2:
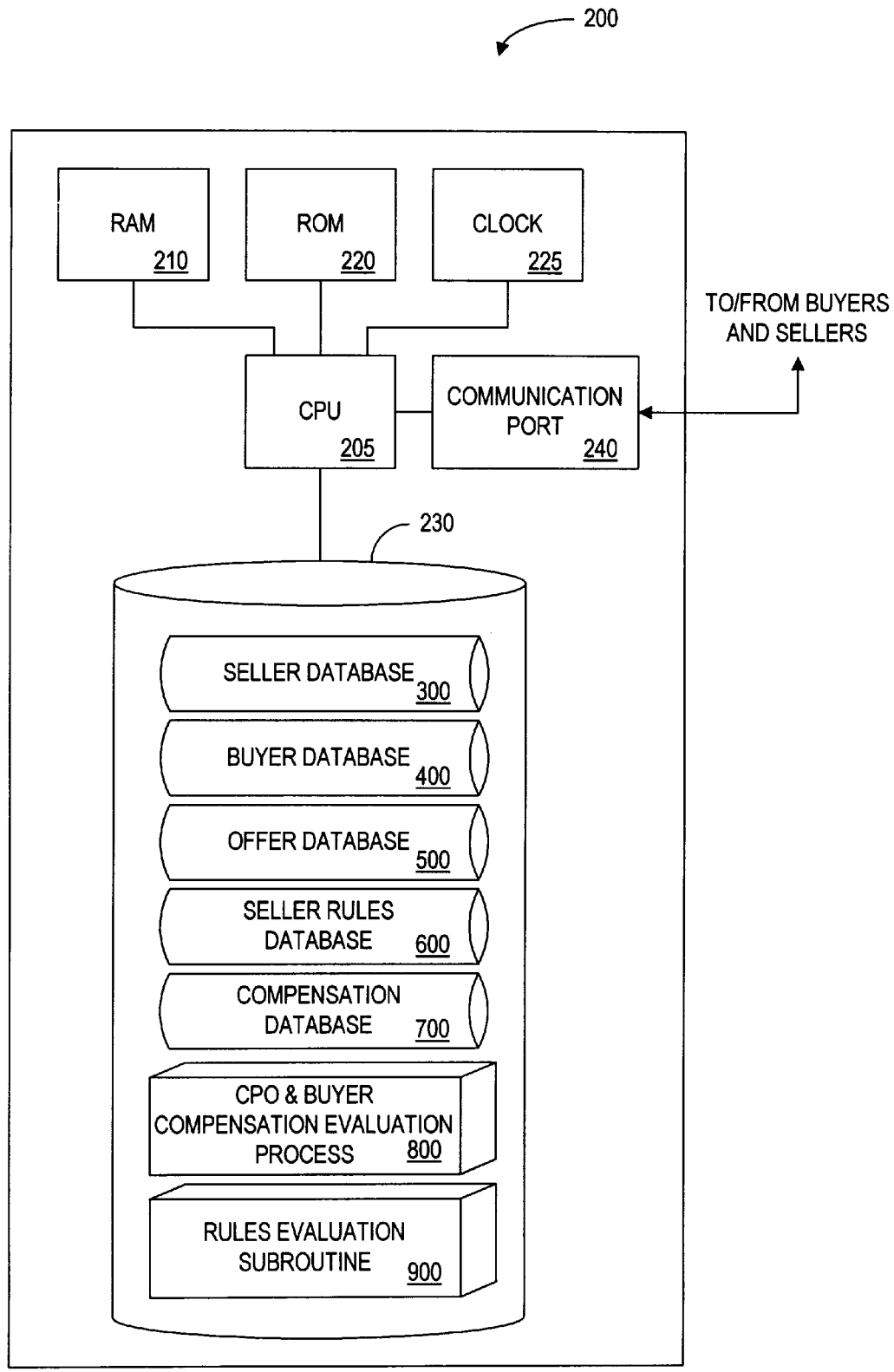
FIG. 2 is a schematic block diagram of the exemplary central controller of FIG. 1.

FIG. 2 is a block diagram showing the architecture of an illustrative central controller 200. The central controller 200 includes certain standard hardware components, such as a central processing unit (CPU) 205, a random access memory (RAM) 210, a read only memory (ROM) 220, a clock 225, a data storage device 230, and a communications port 240. The CPU 205 can be linked to each of the other listed elements, either by means of a shared data bus, or dedicated connections, as shown in FIG. 2. The communications port 240 connects the central controller 200 to each buyer 110 and seller 130 and optionally to remote credit processing servers. The communications port 240 can include multiple communication channels for simultaneously establishing a plurality of connections.

The ROM 220 and/or data storage device 230 are operable to store one or more instructions, discussed further below in conjunction with FIGS. 8 and 9, which the CPU 205 is operable to retrieve, interpret and execute. For example, the ROM 220 and/or data storage device 230 can store processes to accomplish the transfer of required payments, charges and debits, between the sellers 130 and buyers 110. The processing of such accounting transactions can be secured in a conventional manner, for example, using well-known cryptographic techniques.

As discussed further below in conjunction with FIGS. 3 through 6, respectively, the data storage device 230 includes a seller database 300, a buyer database 400, an offer database 500, a seller rules database 600 and a compensation database 700. The seller database 300 stores information on each seller 130, 140, 150 which is registered with the CPO management system 100 to sell products, i.e., goods and/or services to CPO buyers, including contact information. The buyer database 400 stores information on each buyer transacting business through the CPO management system 100, including identification information and billing information, such as a credit card number or another general-purpose account identifier. The offer database 500 contains a record of each CPO processed by the CPO management system 100, including the conditions associated with the CPO and the associated status. The seller rules database 600 maintains the CPO rules for one or more agency-based sellers 130. The compensation database 700 stores the various rejection compensation offers and corresponding predefined eligibility criteria.

In addition, the data storage device 230 includes a CPO and buyer compensation evaluation process 800 and a rules evaluation subroutine 900, discussed further below in conjunction with FIGS. 8 and 9, respectively. Generally, the CPO and buyer compensation evaluation process 800 includes the steps of (i) receiving each CPO from a buyer 110, (ii) providing each CPO to the appropriate broadcast-based sellers and evaluating evaluates each CPO against the appropriate rules of each agency-based seller, (iii) determining whether any sellers 130, 140, 150 accept the CPO, and if the CPO is not accepted by any seller, (iv) determining if the buyer is eligible for rejection compensation. The rules evaluation subroutine 900 is a subroutine executed by the CPO and buyer compensation evaluation process 800, which receives a CPO and compares the CPO against the rules of one or more agency-based sellers to generate a response on behalf of the sellers to the given CPO.

DATABASES

FIG. 3 illustrates an exemplary seller database 300 that stores information on each seller which is registered with the CPO management system 100 to sell goods or services to CPO buyers. The seller database 300 maintains a plurality of records, such as records 305–330, each associated with a different seller. For each seller identifier listed in field 340, the seller database 300 includes the corresponding seller name in field 350, as well as a CPO tracking number and seller account number in fields 360 and 370, respectively. It is noted that the seller identifier stored in field 340 may be utilized, for example, to index the offer database 500 to identify CPOs which have been accepted by the corresponding seller.

FIG. 4 illustrates an exemplary buyer database 400 that stores information on each buyer transacting business through the CPO management system 100, including biographical information and billing information, such as a credit card number or another general purpose account identifier. The buyer database 400 maintains a plurality of records, such as records 405–415, each associated with a different buyer. For each buyer identifier in field 420, the buyer database 400 includes the corresponding buyer name and address in fields 430 and 440, respectively, and credit card account number in field 450. In addition, the buyer database 400 can include the CPO tracking numbers associated with the buyer in field 460. The buyer identifier stored in field 420 may be utilized, for example, to index a historical database (not shown) of previous purchases and CPOs associated with the buyer.

FIG. 5 illustrates an offer database 500 that contains a record of each CPO processed by the CPO management system 100, including the subject and conditions of each CPO and the associated status. The offer database 500 maintains a plurality of records, such as records 505–525, each associated with a different CPO. For each CPO number listed in field 540, the offer database 500 includes an identifier of the buyer associated with the CPO in field 545, as well as the subject and conditions of the CPO in fields 550 and 555, respectively. In addition, the offer database 500 records the buyer-specified CPO price and current status in fields 565 and 575, respectively. The current status options recorded in field 575 include, for example, active, accepted, rejected or expired. A compensation status field 580 contains data indicating the eligibility of a CPO for compensation in the event it is not accepted (i.e. is rejected or expired). Compensation status can include, for example, not eligible, compensation sent (i.e. eligible and paid), or pending (i.e. eligible if rejected or expired). A compensation identifier field 585 references eligible compensation offers to the compensation data stored in compensation database 700, discussed below.

FIG. 6 illustrates a seller rules database 600 that maintains the CPO rules for one or more agency-based sellers. The seller rules database 600 maintains a plurality of records, such as records 605–615, each associated with a different CPO rule. For each CPO rule identified in field 640, the seller rules database 600 identifies the corresponding seller identifier in field 645, as well as the required conditions and minimum price for a CPO to be accepted on behalf of the corresponding seller in fields 650 and 655, respectively.

FIG. 7 illustrates a compensation database 700 that stores the various rejection compensation offers and corresponding predefined eligibility criteria. The compensation database 700 maintains a plurality of records, such as records 705 and 710, each associated with a different compensation offer. For each compensation offer identified in field 740, the compensation database 700 identifies the corresponding product class in field 745, as well as the minimum required conditions for an unaccepted CPO to be eligible for rejection compensation in field 750. A description of the rejection compensation is provided in field 755.

It will be appreciated that many different processes are available for determining the value of the rejection compensation. In one embodiment, it may simply be fixed by the CPO system. In other embodiments, the value of the compensation may be dependent on the value of the offer, and/or it may be a function of the relationship between the offer price and the market value. With respect to airline travel, the compensation value may be determined as a function of how close the buyer offer is made relative to a travel date and/or a peak travel time. In yet another embodiment, the value of the compensation may be a function of the amount of time that the offer is made available to potential sellers.

PROCESSES

As discussed above, the central controller 200 can execute a CPO and buyer compensation evaluation process 800 that includes the steps of (i) receiving each CPO from a buyer 110, (ii) providing each CPO to the appropriate broadcast-based sellers and evaluating each CPO against the appropriate rules of each agency-based seller, (iii) determining whether any sellers 130, 140, 150 accept the CPO, and if the CPO is not accepted by any seller, (iv) determining if the buyer is eligible for rejection compensation. While CPOs may be binding or nonbinding in nature, the present embodiment is described with respect to a binding CPO. The processing of a nonbinding CPO is substantially identical, with the exception that authorization to charge the buyer credit card account (or another general purpose account) may be obtained after a seller acceptance of the CPO is identified. Alternatively, the process may be identical with the buyer being given the option to renege after the CPO is accepted by a seller.

Figure 8A:
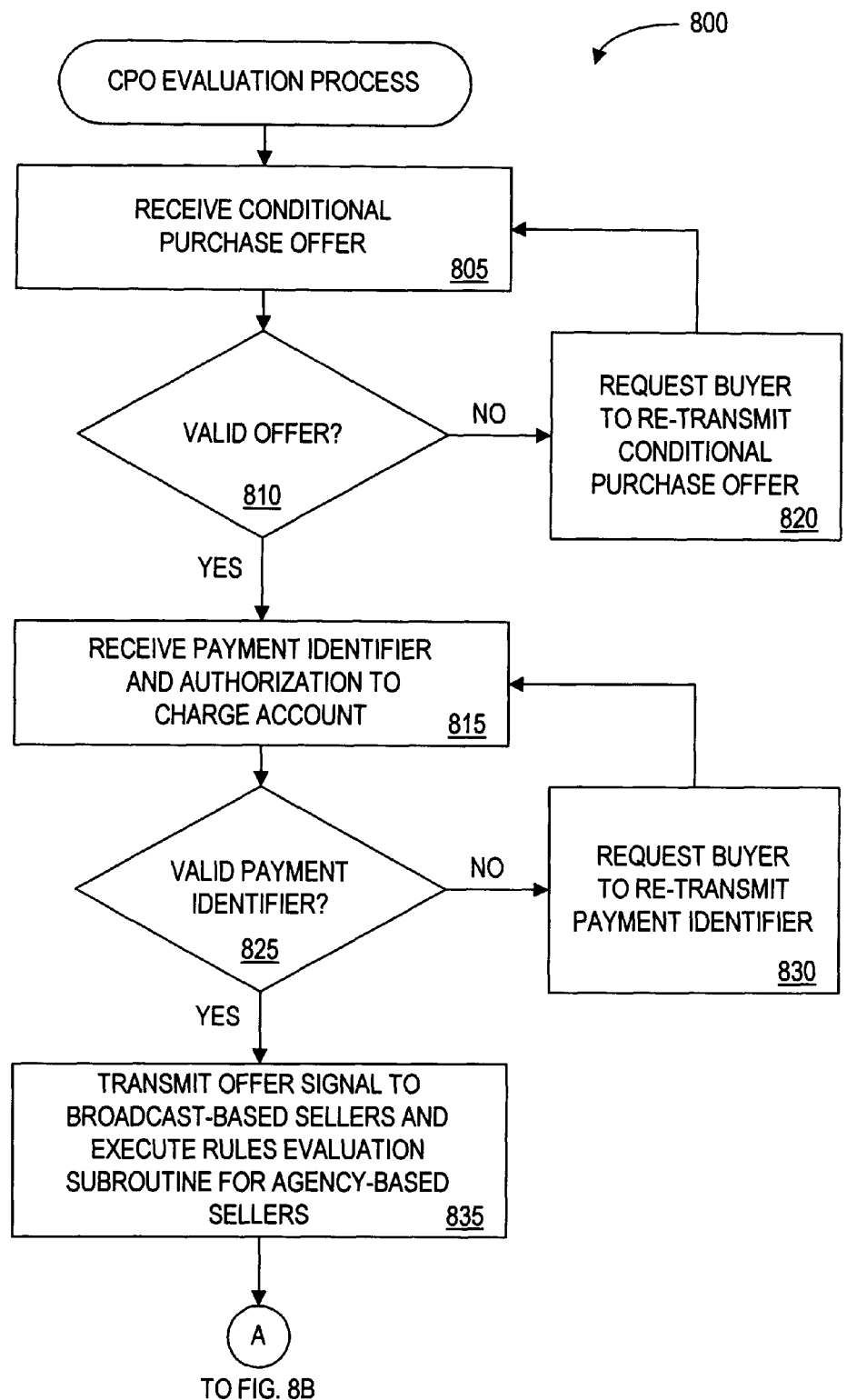
FIG. 8 is a flowchart describing an exemplary CPO and buyer compensation evaluation process implemented by the central controller of FIG. 2.
Figure 8B:
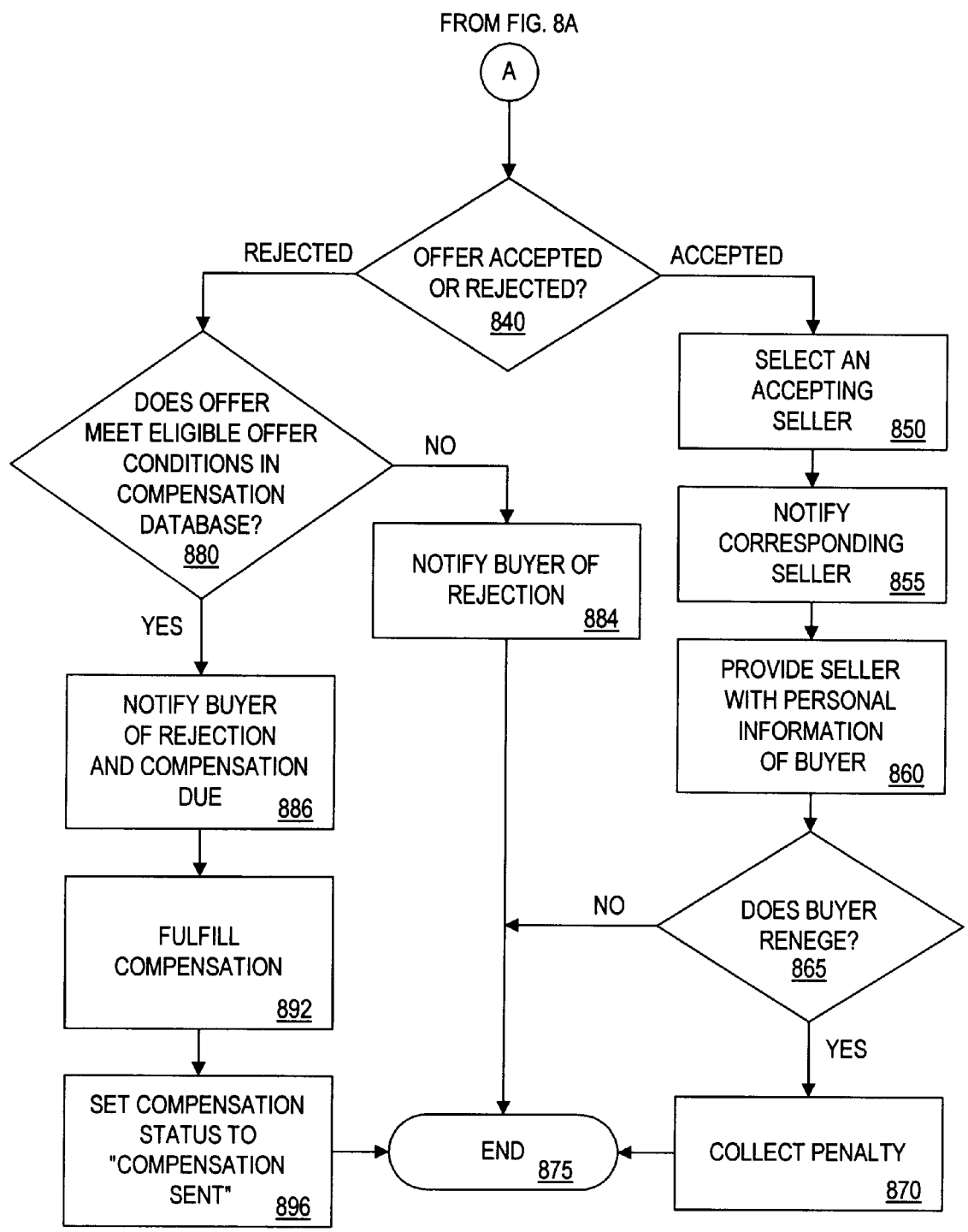
Figure 9:
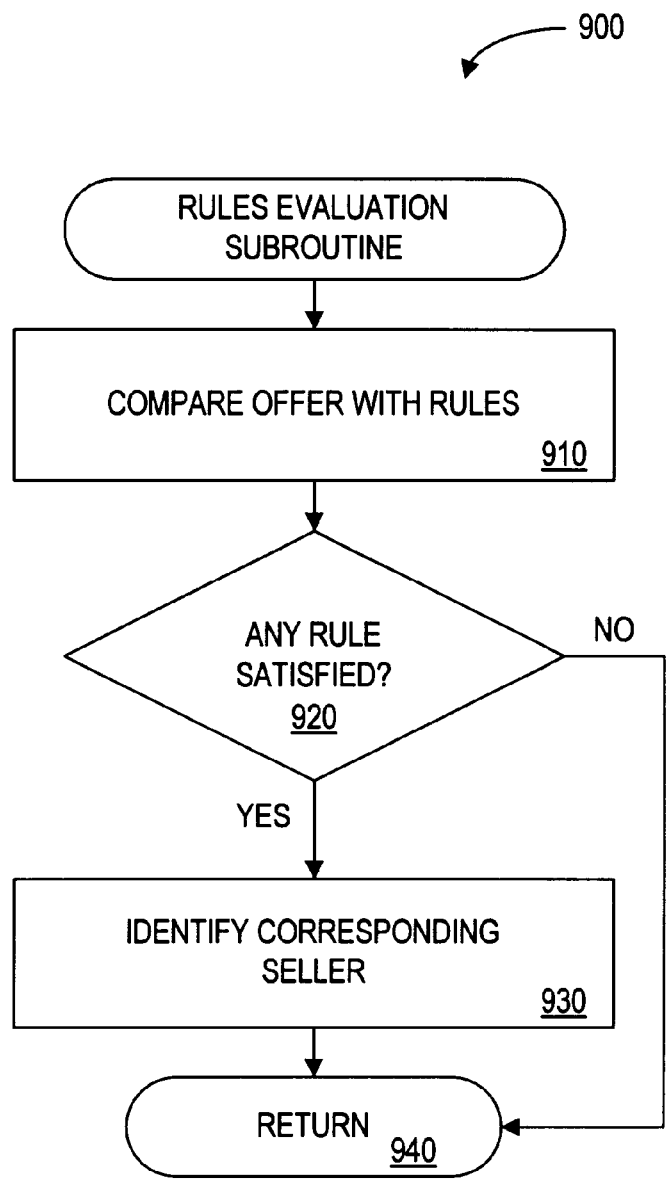
FIG. 9 is a flowchart describing an exemplary rules evaluation subroutine implemented by the central controller of FIG. 2.

As shown in FIG. 8, the CPO and buyer compensation evaluation process 800 initially receives a CPO from a buyer 10 during step 805. In one embodiment, the predefined eligibility criteria for receiving rejection compensation can be provided to a buyer before a CPO is submitted by the buyer. A test is then performed during step 810 to determine if the CPO is valid. For example, the test performed during step 810 may determine if the buyer has specified each of the relevant conditions for a given product category.

If it is determined during step 810 that the terms of the CPO are not valid, then the buyer is requested to retransmit the CPO during step 820 and program control returns to step 805. If, however, it is determined during step 810 that the terms of the CPO are valid, then an identifier of a general purpose account, such as a credit or debit card account from which funds may be paid, and an authorization to charge such general purpose account, are received during step 815. In this manner, the CPO is guaranteed with a general-purpose account, for example, using a line of credit on a credit card account. Appropriate legal language can be displayed or read to the buyer at the time the CPO is received, to form a binding CPO.

A test is then performed during step 825 to determine if the payment identifier is valid. For example, the payment identifier may be transmitted to a remote credit card server for pre-authorization or the like. If it is determined during step 825 that the payment identifier is not valid, then the buyer is requested to retransmit a different payment identifier during step 830 and program control returns to step 815. If, however, it is determined during step 825 that the payment identifier is valid, then the CPO management system 100 transmits the CPO to the broadcast-based sellers and executes the rules evaluation subroutine 900, discussed below in conjunction with FIG. 9, for agency-based sellers during step 835.

A test is performed during step 840 to determine if the CPO is accepted or rejected (including expired CPOs). If it is determined during step 840 that the CPO is accepted, the CPO is processed during steps 850 through 870. The CPO evaluation process 800 selects one accepting seller during step 850 and notifies the corresponding seller during step 855. For example, the accepting seller can be selected based upon (i) the priority in which the acceptances are received, (ii) the CPO acceptance rate of each seller, (iii) priorities negotiated by each seller, (iv) the acceptance providing the lowest cost to the buyer, or (v) the highest commission rates paid by the seller to the CPO management system 100.

The buyer's personal information is provided to the seller during step 860 and the buyer is notified of the acceptance. A test is then performed during step 865 to determine if the buyer reneges on consummating the transaction. If it is determined during step 865 that the buyer reneges on consummating the transaction, then a penalty is charged to the buyer's designated general-purpose account during step 870, before program control terminates during step 875. It is noted that for a nonbinding CPO the buyer may be charged a penalty for failing to complete the transaction in the event the CPO is accepted. For a binding CPO, however, the CPO is guaranteed by the general purpose account and it is not possible for the buyer to renege. If, however, it is determined during step 865 that the buyer does not renege on consummating the transaction, then program control terminates during step 875.

If it is determined during step 840 that the CPO is rejected, or has expired, then a further test is performed during step 880 to determine if the CPO meets the predefined eligibility conditions of any compensation offer in the compensation database 700. If it is determined during step 880 that the CPO does not meet the predefined eligibility conditions of any compensation offer in the compensation database 700, then the buyer is notified of the rejection during step 884, before program control terminates during step 875.

If, however, it is determined during step 880 that the CPO does meet the predefined eligibility conditions of any compensation offer in the compensation database 700, then the buyer is notified of the rejection and the amount of the rejection compensation due during step 886. The compensation is fulfilled during step 892 and the status of the compensation offer is set to "compensation sent" in the offer database 500 during step 896, before program control terminates during step 875.

As previously indicated, the CPO and buyer compensation evaluation process 800 executes a rules evaluation subroutine 800 during step 835 to determine if one or more agency-based sellers are willing to accept a given CPO. As shown in FIG. 9, the rules evaluation subroutine 900 compares the terms associated with the CPO during step 910 with the corresponding restrictions set forth in any CPO rules defined by any agency-based seller. A test is then performed during step 920 to determine if any CPO rule is satisfied. If it is determined during step 920 that no CPO rule is satisfied, then program control terminates during step 940. If, however, it is determined during step 920 that a CPO rule is satisfied, the corresponding seller is identified during step 930, before program control terminates during step 940.

It is to be understood that the embodiments and variations shown and described herein are merely illustrative of the principles of this invention and that various modifications may be implemented by those skilled in the art without departing from the scope and spirit of the invention.

We claim:

1. A method of using a computer to compensate buyers who make conditional purchase offers, comprising:

receiving, using a computer, a conditional purchase offer from a buyer for a product, said conditional purchase offer containing at least one buyer-defined condition and a variable condition;

processing said conditional purchase offer to determine if said conditional purchase offer is accepted by a seller; and compensating said buyer if said conditional purchase offer is not accepted by a seller.

2. A method of using a computer to compensate buyers who make conditional purchase offers, comprising:

receiving, using a computer, a conditional purchase offer from a buyer for a product, said conditional purchase offer containing at least one buyer-defined condition;

processing said conditional purchase offer to determine if said conditional purchase offer is accepted by a seller;

preventing said buyer from identifying an acceptable seller price; and compensating said buyer if said conditional purchase offer is not accepted by a seller.

3. A method of using a computer to compensate buyers who make conditional purchase offers, comprising:

receiving, using a computer, a conditional purchase offer from a buyer for a product, said conditional purchase offer containing at least one buyer-defined condition;

processing said conditional purchase offer to determine if said conditional purchase offer is accepted by a seller;

compensating said buyer if said conditional purchase offer is not accepted by a seller; and maintaining the anonymity of said seller until said conditional purchase offer is accepted.

4. The method according to claims 1, 9 or 12, wherein processing said conditional purchase offer comprises providing said conditional purchase offer to a plurality of potential sellers of said product.

5. The method according to claims 1, 2 or 3, wherein processing said conditional purchase offer comprises identifying one or more rules from a plurality of potential sellers, each of said rules containing one or more seller-defined restrictions.

6. The method according to claims 1, 2 or 3, wherein said buyer may be compensated with a rejection compensation selected from the group comprising (i) a cash award, (ii) a prize, or (iii) a coupon or credit that may be redeemed for a discount against a future sale.

7. The method according to claims 1, 2 or 3, wherein said conditional purchase offer further includes a payment identifier for specifying an account from which funds may be paid.

8. The method according to claim 7, further comprising using said payment identifier to pay a penalty if said buyer does not complete said sale.

9. The method according to claim 7, wherein said funds are paid from a general-purpose account.

10. The method according to claims 1, 2 or 3, wherein said conditional purchase offer is a binding conditional purchase offer.

11. The method according to claim 2, wherein preventing said buyer from identifying said acceptable seller price comprises requiring said buyer to submit a binding conditional purchase offer.

12. The method according to claim 2, wherein preventing said buyer from identifying said acceptable seller price comprises preventing said buyer from submitting multiple conditional purchase offers.

13. A method of using a computer to compensate buyers who make conditional purchase offers, comprising:

receiving, using a computer, a conditional purchase offer from a buyer for a product, said conditional purchase offer containing at least one buyer-defined condition;

processing said conditional purchase offer to determine if said conditional purchase offer is accepted by a seller; and compensating said buyer if an unaccepted conditional purchase offer meets predefined criteria;

wherein said predefined criteria includes a minimum offer price.

14. A method of using a computer to compensate buyers who make conditional purchase offers, comprising:

receiving, using a computer, a conditional purchase offer from a buyer for a product, said conditional purchase offer containing at least one buyer-defined condition and a variable condition;

processing said conditional purchase offer to determine if said conditional purchase offer is accepted by a seller; and compensating said buyer if an unaccepted conditional purchase offer meets predefined criteria.

15. A method of using a computer to compensate buyers who make conditional purchase offers, comprising:

receiving, using a computer, a conditional purchase offer from a buyer for a product, said conditional purchase offer containing at least one buyer-defined condition;

processing said conditional purchase offer to determine if said conditional purchase offer is accepted by a seller;

compensating said buyer if an unaccepted conditional purchase offer meets predefined criteria; and preventing said buyer from identifying an acceptable seller price.

16. A method of using a computer to compensate buyers who make conditional purchase offers, comprising:

receiving, using a computer, a conditional purchase offer from a buyer for a product, said conditional purchase offer containing at least one buyer-defined condition;

processing said conditional purchase offer to determine if said conditional purchase offer is accepted by a seller;

compensating said buyer if an unaccepted conditional purchase offer meets predefined criteria; and maintaining the anonymity of said seller until said conditional purchase offer is accepted.

17. The method according to claims 13, 14, 15 or 16, wherein processing said conditional purchase offer comprises providing said conditional purchase offer to a plurality of potential sellers of said product.

18. The method according to claims 13, 14, 15 or 16, wherein processing said conditional purchase offer comprises identifying one or more rules from a plurality of potential sellers, each of said rules containing one or more seller-defined restrictions.

19. The method according to claims 13, 14, 15 or 16, wherein said buyer may be compensated with a rejection compensation selected from the group comprising (i) a cash award, (ii) a prize, or (iii) a coupon or credit that may be redeemed for a discount against a future sale.

20. The method according to claims 13, 14, 15 or 16, wherein said conditional purchase offer further includes a payment identifier for specifying an account from which funds may be paid.

21. The method according to claim 20, further comprising using said payment identifier to pay a penalty if said buyer does not complete said sale.

22. The method according to claim 20, wherein said funds are paid from a general-purpose account.

23. The method according to claims 13, 14, 15 or 16, wherein said conditional purchase offer is a binding conditional purchase offer.

24. The method according to claim 15, wherein preventing said buyer from identifying said acceptable seller price comprises requiring said buyer to submit a binding conditional purchase offer.

25. The method according to claim 15, wherein preventing said buyer from identifying said acceptable seller price comprises preventing said buyer from submitting multiple conditional purchase offers.

26. A system for compensating buyers who make conditional purchase offers, comprising:
a memory device; and
a processor in communication with said memory device, said processor configured to:
receive a conditional purchase offer from a buyer for a product, said conditional purchase offer containing at least one buyer-defined condition and a variable condition;
process said conditional purchase offer to determine if said conditional purchase offer is accepted by a seller; and
compensate said buyer if said conditional purchase offer is not accepted by a seller.

27. A system for compensating buyers who make conditional purchase offers, comprising:
a memory device; and
a processor in communication with said memory device, said processor configured to:
receive a conditional purchase offer from a buyer for a product, said conditional purchase offer containing at least one buyer-defined condition;
process said conditional purchase offer to determine if said conditional purchase offer is accepted by a seller;
prevent said buyer from identifying an acceptable seller price; and
compensate said buyer if said conditional purchase offer is not accepted by a seller.

28. The system according to claim 27, wherein preventing said buyer from identifying said acceptable seller price comprises requiring said buyer to submit a binding conditional purchase offer.

29. The system according to claim 27, wherein preventing said buyer from identifying said acceptable seller price comprises preventing said buyer from submitting multiple conditional purchase offers.

30. A system for compensating buyers who make conditional purchase offers, comprising:
a memory device; and
a processor in communication with said memory device, said processor configured to:
receive a conditional purchase offer from a buyer for a product, said conditional purchase offer containing at least one buyer-defined condition;
process said conditional purchase offer to determine if said conditional purchase offer is accepted by a seller;
compensate said buyer if said conditional purchase offer is not accepted by a seller; and
maintain the anonymity of said seller until said conditional purchase offer is accepted.

31. The system according to claims 26, 27 or 30, wherein processing said conditional purchase offer comprises providing said conditional purchase offer to a plurality of potential sellers of said product.

32. The system according to claims 26, 27 or 30, wherein processing said conditional purchase offer comprises identifying one or more rules from a plurality of potential sellers, each of said rules containing one or more seller-defined restrictions.

33. The system according to claims 26, 27 or 30, wherein said buyer may be compensated with a rejection compensation selected from the group comprising (i) a cash award, (ii) a prize, or (iii) a coupon or credit that may be redeemed for a discount against a future sale.

34. The system according to claims 26, 27 or 30, wherein said conditional purchase offer further includes a payment identifier for specifying an account from which funds may be paid.

35. The system according to claim 34, wherein said processor is further configured to use said payment identifier to pay a penalty if said buyer does not complete said sale.

36. The system according to claim 34, wherein said funds are paid from a general-purpose account.

37. The system according to claims 26, 27 or 30, wherein said conditional purchase offer is a binding conditional purchase offer.

38. A system for compensating buyers who make conditional purchase offers, comprising:
a memory device; and
a processor in communication with said memory device, said processor configured to:
receive a conditional purchase offer from a buyer for a product, said conditional purchase offer containing at least one buyer-defined condition;
process said conditional purchase offer to determine if said conditional purchase offer is accepted by a seller; and
compensate said buyer if an unaccepted conditional purchase offer meets predefined criteria;
wherein said predefined criteria includes a minimum offer price.

39. A system for compensating buyers who make conditional purchase offers, comprising:
a memory device; and
a processor in communication with said memory device, said processor configured to:
receive a conditional purchase offer from a buyer for a product, said conditional purchase offer containing at least one buyer-defined condition and a variable condition;
process said conditional purchase offer to determine if said conditional purchase offer is accepted by a seller; and
compensate said buyer if an unaccepted conditional purchase offer meets predefined criteria.

40. A system for compensating buyers who make conditional purchase offers, comprising:
a memory device; and
a processor in communication with said memory device, said processor configured to:
receive a conditional purchase offer from a buyer for a product, said conditional purchase offer containing at least one buyer-defined condition;
process said conditional purchase offer to determine if said conditional purchase offer is accepted by a seller;
compensate said buyer if an unaccepted conditional purchase offer meets predefined criteria; and
prevent said buyer from identifying an acceptable seller price.

41. The system according to claim 40, wherein preventing said buyer from identifying said acceptable seller price comprises requiring said buyer to submit a binding conditional purchase offer.

42. The system according to claim 40, wherein preventing said buyer from identifying said acceptable seller price comprises preventing said buyer from submitting multiple conditional purchase offers.

43. A system for compensating buyers who make conditional purchase offers, comprising:

a memory device; and a processor in communication with said memory device, said processor configured to:
receive a conditional purchase offer from a buyer for a product, said conditional purchase offer containing at least one buyer-defined condition;
process said conditional purchase offer to determine if said conditional purchase offer is accepted by a seller;
compensate said buyer if an unaccepted conditional purchase offer meets predefined criteria; and
maintain the anonymity of said seller until said conditional purchase offer is accepted.

44. The system according to claims 38, 39, 40 or 43, wherein processing said conditional purchase offer comprises providing said conditional purchase offer to a plurality of potential sellers of said product.

45. The system according to claims 38, 39, 40 and 43, wherein processing said conditional purchase offer comprises identifying one or more rules from a plurality of potential sellers, each of said rules containing one or more seller-defined restrictions.

46. The system according to claims 38, 39, 40 or 43, wherein said buyer may be compensated with a rejection compensation selected from the group comprising (i) a cash award, (ii) a prize, or (iii) a coupon or credit that may be redeemed for a discount against a future sale.

47. The system according to claims 38, 39, 40 or 43, wherein said conditional purchase offer further includes a payment identifier for specifying an account from which funds may be paid.

48. The system according to claim 47, wherein said processor is further configured to use said payment identifier to pay a penalty if said buyer does not complete said sale.

49. The system according to claim 47, wherein said funds are paid from a general-purpose account.

50. The system according to claims 38, 39, 40 or 43, wherein said conditional purchase offer is a binding conditional purchase offer.

51. A system for compensating buyers who make conditional purchase offers, comprising:
means for receiving a conditional purchase offer from a buyer for a product, said conditional purchase offer containing at least one buyer-defined condition and a variable condition;
means for processing said conditional purchase offer to determine if said conditional purchase offer is accepted by a seller; and
means for compensating said buyer if said conditional purchase offer is not accepted by a seller.

52. A system for compensating buyers who make conditional purchase offers, comprising:
means for receiving a conditional purchase offer from a buyer for a product, said conditional purchase offer containing at least one buyer-defined condition;
means for processing said conditional purchase offer to determine if said conditional purchase offer is accepted by a seller;
means for preventing said buyer from identifying an acceptable seller price; and
means for compensating said buyer if said conditional purchase offer is not accepted by a seller.

53. The system according to claim 52, wherein said means for preventing said buyer from identifying said acceptable seller price comprises means for requiring said buyer to submit a binding conditional purchase offer.

54. The system according to claim 52, wherein said means for preventing said buyer from identifying said acceptable seller price comprises means for preventing said buyer from submitting multiple conditional purchase offers.

55. A system for compensating buyers who make conditional purchase offers, comprising:
means for receiving a conditional purchase offer from a buyer for a product, said conditional purchase offer containing at least one buyer-defined condition;
means for processing said conditional purchase offer to determine if said conditional purchase offer is accepted by a seller;
means for compensating said buyer if said conditional purchase offer is not accepted by a seller; and
means for maintaining the anonymity of said seller until said conditional purchase offer is accepted.

56. The system according to claims 51, 52, or 55, wherein said means for processing said conditional purchase offer comprises means for providing said conditional purchase offer to a plurality of potential sellers of said product.

57. The system according to claims 51, 52 or 55, wherein said means for processing said conditional purchase offer comprises means for identifying one or more rules from a plurality of potential sellers, each of said rules containing one or more seller-defined restrictions.

58. The system according to claims 51, 52 or 55, wherein said buyer may be compensated with a rejection compensation selected from the group comprising (i) a cash award, (ii) a prize, or (iii) a coupon or credit that may be redeemed for a discount against a future sale.

59. The system according to claims 51, 52 or 55, wherein said conditional purchase offer further includes a payment identifier for specifying an account from which funds may be paid.

60. The system according to claims 51, 52 or 55 wherein said conditional purchase offer is a binding conditional purchase offer.

61. A system for compensating buyers who make conditional purchase offers, comprising:
means for receiving a conditional purchase offer from a buyer for a product, said conditional purchase offer containing at least one buyer-defined condition;
means for processing said conditional purchase offer to determine if said conditional purchase offer is accepted by a seller; and
means for compensating said buyer if an unaccepted conditional purchase offer meets predefined criteria;
wherein said predefined criteria includes a minimum offer price.

62. A system for compensating buyers who make conditional purchase offers, comprising:
means for receiving a conditional purchase offer from a buyer for a product, said conditional purchase offer containing at least one buyer-defined condition and a variable condition;
means for processing said conditional purchase offer to determine if said conditional purchase offer is accepted by a seller; and
means for compensating said buyer if an unaccepted conditional purchase offer meets predefined criteria.

63. A system for compensating buyers who make conditional purchase offers, comprising:
means for receiving a conditional purchase offer from a buyer for a product, said conditional purchase offer containing at least one buyer-defined condition;

means for processing said conditional purchase offer to determine if said conditional purchase offer is accepted by a seller;

means for compensating said buyer if an unaccepted conditional purchase offer meets predefined criteria; and means for preventing said buyer from identifying an acceptable seller price.

64. A system for compensating buyers who make conditional purchase offers, comprising:

means for receiving a conditional purchase offer from a buyer for a product, said conditional purchase offer containing at least one buyer-defined condition;

means for processing said conditional purchase offer to determine if said conditional purchase offer is accepted by a seller;

means for compensating said buyer if an unaccepted conditional purchase offer meets predefined criteria; and means for maintaining the anonymity of said seller until said conditional purchase offer is accepted.

65. A computer device comprising:

a computer readable medium having computer readable program means embodied therein, said computer readable program means for:

receiving a conditional purchase offer from a buyer for a product, said conditional purchase offer containing at least one buyer-defined condition and a variable condition;

processing said conditional purchase offer to determine if said conditional purchase offer is accepted by a seller; and compensating said buyer if said conditional purchase offer is not accepted by a seller.

66. A computer device comprising:

a computer readable medium having computer readable program means embodied therein, said computer readable program means for:

receiving a conditional purchase offer from a buyer for a product, said conditional purchase offer containing at least one buyer-defined condition;

processing said conditional purchase offer to determine if said conditional purchase offer is accepted by a seller;

preventing said buyer from identifying an acceptable seller price; and compensating said buyer if said conditional purchase offer is not accepted by a seller.

67. A computer device comprising:

a computer readable medium having computer readable program means embodied therein, said computer readable program means for:

receiving a conditional purchase offer from a buyer for a product, said conditional purchase offer containing at least one buyer-defined condition;

processing said conditional purchase offer to determine if said conditional purchase offer is accepted by a seller;

compensating said buyer if said conditional purchase offer is not accepted by a seller; and maintaining the anonymity of said seller until said conditional purchase offer is accepted.

68. A computer device comprising:

a computer readable medium having computer readable program means embodied therein, said computer readable program means for:

receiving a conditional purchase offer from a buyer for a product, said conditional purchase offer containing at least one buyer-defined condition;

processing said conditional purchase offer to determine if said conditional purchase offer is accepted by a seller; and compensating said buyer if an unaccepted conditional purchase offer meets predefined criteria;

wherein said predefined criteria includes a minimum offer price.

69. A computer device comprising:

a computer readable medium having computer readable program means embodied therein, said computer readable program means for:

receiving a conditional purchase offer from a buyer for a product, said conditional purchase offer containing at least one buyer-defined condition and a variable condition;

processing said conditional purchase offer to determine if said conditional purchase offer is accepted by a seller; and compensating said buyer if an unaccepted conditional purchase offer meets predefined criteria.

70. A computer device comprising:

a computer readable medium having computer readable program means embodied therein, said computer readable program means for:

receiving a conditional purchase offer from a buyer for a product, said conditional purchase offer containing at least one buyer-defined condition;

processing said conditional purchase offer to determine if said conditional purchase offer is accepted by a seller;

compensating said buyer if an unaccepted conditional purchase offer meets predefined criteria; and preventing said buyer from identifying an acceptable seller price.

71. A computer device comprising:

a computer readable medium having computer readable program means embodied therein, said computer readable program means for:

receiving a conditional purchase offer from a buyer for a product, said conditional purchase offer containing at least one buyer-defined condition;

processing said conditional purchase offer to determine if said conditional purchase offer is accepted by a seller;

compensating said buyer if an unaccepted conditional purchase offer meets predefined criteria; and maintaining the anonymity of said seller until said conditional purchase offer is accepted.

* * * * *